(12) United States Patent
Yoo et al.

(10) Patent No.: US 12,438,230 B2
(45) Date of Patent: Oct. 7, 2025

(54) BATTERY MODULE, BATTERY RACK, AND POWER STORAGE DEVICE

(71) Applicant: LG ENERGY SOLUTION, LTD., Seoul (KR)

(72) Inventors: Jae-Min Yoo, Daejeon (KR); Seung-Joon Kim, Daejeon (KR); Eun-Gyu Shin, Daejeon (KR); Young-Bum Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 524 days.

(21) Appl. No.: 17/908,755

(22) PCT Filed: Sep. 13, 2021

(86) PCT No.: PCT/KR2021/012445
§ 371 (c)(1),
(2) Date: Sep. 1, 2022

(87) PCT Pub. No.: WO2022/075620
PCT Pub. Date: Apr. 14, 2022

(65) Prior Publication Data
US 2023/0123282 A1 Apr. 20, 2023

(30) Foreign Application Priority Data
Oct. 8, 2020 (KR) .......................... 10-2020-0130506

(51) Int. Cl.
*H01M 50/383* (2021.01)
*H01M 50/367* (2021.01)

(52) U.S. Cl.
CPC ....... *H01M 50/383* (2021.01); *H01M 50/367* (2021.01)

(58) Field of Classification Search
CPC ............. H01M 50/383; H01M 50/367; H01M 10/653; H01M 10/6566; H01M 50/249;
(Continued)

(56) References Cited

U.S. PATENT DOCUMENTS 10,637,111 B2 * 4/2020 Choi .................... H01M 10/625
10,892,464 B2 * 1/2021 Ryu .................... H01M 10/643
(Continued)

FOREIGN PATENT DOCUMENTS

CN 105493338 A 4/2016
CN 205876808 U 1/2017
(Continued)

OTHER PUBLICATIONS

International Search Report (PCT/ISA/210) issued in PCT/KR2021/012445, dated Jan. 3, 2022.
(Continued)

*Primary Examiner* — Kaity V Chandler
(74) *Attorney, Agent, or Firm* — Birch, Stewart, Kolasch & Birch, LLP

(57) ABSTRACT

A battery module prevents a fire from increasing in size and prevents electrical short circuits due to dew condensation in case of a fire. A battery module for achieving the object as described above includes a cell assembly having a plurality of battery cells, a front cover including an upper wall, a lower wall, a left wall, and a right wall, which form an inner space, and a module case accommodating the cell assembly in the inner space, coupled to the front cover, and provided with a cover portion that has a portion protruding to face at least one of the upper wall, the lower wall, the left wall, and the right wall.

10 Claims, 7 Drawing Sheets

(58) Field of Classification Search
CPC ............. H01M 50/264; H01M 50/271; H01M 2250/20; H01M 2220/20; H01M 50/20; H01M 10/627; H01M 10/658; H01M 50/24; H01M 2200/10; H01M 2220/10; Y02E 60/10; A62C 2/06; A62C 2/065; A62C 3/16

See application file for complete search history.

(56) References Cited

U.S. PATENT DOCUMENTS

| | | | |
|---|---|---|---|
| 2007/0219670 A1 | 9/2007 | Tanaka et al. | |
| 2009/0142650 A1* | 6/2009 | Okada | H01M 10/6563 429/71 |
| 2013/0224541 A1 | 8/2013 | Nam et al. | |
| 2014/0072844 A1* | 3/2014 | Oh | H01M 10/6572 429/71 |
| 2015/0287963 A1 | 10/2015 | Chiba | |
| 2016/0204487 A1 | 7/2016 | Morioka et al. | |
| 2017/0187084 A1* | 6/2017 | Park | H01M 10/613 |
| 2018/0248239 A1 | 8/2018 | Nam et al. | |
| 2019/0097192 A1 | 3/2019 | Kim et al. | |
| 2020/0194851 A1 | 6/2020 | Seo et al. | |
| 2020/0266398 A1 | 8/2020 | Choi et al. | |
| 2021/0143508 A1* | 5/2021 | Yoshida | H01M 50/291 |
| 2021/0320385 A1 | 10/2021 | Kim et al. | |
| 2022/0069400 A1 | 3/2022 | Hidaka et al. | |

FOREIGN PATENT DOCUMENTS

| | | | | |
|---|---|---|---|---|
| CN | 206322741 U | * | 7/2017 | ............. Y02E 60/10 |
| CN | 206834289 U | * | 1/2018 | .......... H01M 10/613 |
| CN | 208423110 U | * | 1/2019 | ............. Y02E 60/10 |
| CN | 212659594 U | * | 3/2021 | ........... Y02E 60/10 |
| EP | 3 343 691 A1 | | 7/2018 | |
| EP | 4 027 439 A1 | | 7/2022 | |
| JP | 2006-109542 A | | 4/2006 | |
| JP | 2008-152956 A | | 7/2008 | |
| JP | 2010-108788 A | | 5/2010 | |
| JP | 2010-244822 A | | 10/2010 | |
| JP | 2010-272378 A | | 12/2010 | |
| JP | 2014-103051 A | | 6/2014 | |
| JP | 2014-192028 A | | 10/2014 | |
| JP | 2015-153616 A | | 8/2015 | |
| KR | 10-2006-0064854 A | | 6/2006 | |
| KR | 2009-134900 A | | 6/2009 | |
| KR | 10-2012-0055156 A | | 5/2012 | |
| KR | 10-2018-0097898 A | | 9/2018 | |
| KR | 10-2019-0036260 A | | 4/2019 | |
| KR | 10-2019-0110782 A | | 10/2019 | |
| KR | 10-2019-0115940 A | | 10/2019 | |
| KR | 10-2020-0044423 A | | 4/2020 | |
| KR | 20200036640 A | * | 4/2020 | .......... H01M 10/643 |
| KR | 10-2120933 B1 | | 6/2020 | |
| KR | 10-2020-0080079 A | | 7/2020 | |
| KR | 10-2020-0105315 A | | 9/2020 | |
| WO | WO 2020/137411 A1 | | 7/2020 | |

OTHER PUBLICATIONS

European Search Report for European Application No. 21877872.8, dated Mar. 26, 2024.

* cited by examiner

BATTERY MODULE, BATTERY RACK, AND POWER STORAGE DEVICE

TECHNICAL FIELD

The present disclosure relates to a battery module, a battery rack, and a power storage device, and more particularly, to a battery module capable of preventing a fire from increasing in size and preventing electrical short circuits due to dew condensation in case of a fire.

The present application claims priority to Korean Patent Application No. 10-2020-0130506 filed on Oct. 8, 2020 in the Republic of Korea, the disclosures of which are incorporated herein by reference.

BACKGROUND ART

Currently commercialized secondary batteries include nickel cadmium batteries, nickel hydrogen batteries, nickel zinc batteries, and lithium secondary batteries, wherein compared to nickel-based secondary batteries, the lithium secondary batteries have little memory effect, and thus, are attracting attention because of their advantages such as free charge and discharge, extremely low self-discharge rate, and high energy density.

The lithium secondary batteries use a lithium-based oxide and a carbon material as a positive electrode active material and a negative electrode active material, respectively. Lithium secondary batteries includes an electrode assembly in which a positive electrode plate and a negative electrode plate, to which a positive electrode active material and a negative electrode active material are applied, respectively, are arranged with a separator therebetween, respectively, and a packaging material for sealing and accommodating the electrode assembly together with an electrolyte, that is, a battery pouch packaging material.

Recently, secondary batteries have been widely used not only in small devices such as portable electronic devices, but also in medium and large devices such as vehicles or power storage devices. When used in the medium and large devices, a number of secondary batteries are electrically connected to each other to increase capacity and output. Especially, pouch-type secondary batteries are widely used in the medium and large devices due to an advantage of easy stacking.

Meanwhile, as a need for a large-capacity structure, including application as an energy storage source, increases, a demand for a battery module including a plurality of secondary batteries electrically connected in series and/or parallel and a module housing accommodating the secondary batteries therein is increasing.

However, in battery modules of the related art, when some of a plurality of secondary batteries provided therein are ignited or exploded, heat or fire is propagated between the plurality of secondary batteries, and the flame may melt and make a hole in a portion of a battery module. In some cases, through the punctured portion, the flame is erupted to the outside of the battery module such that the fire is transferred to another neighboring battery module, or outside air is introduced into the battery module to help combustion, leading to a bigger fire or a secondary explosion.

Furthermore, in the battery modules of the related art, an electrical short circuit or spark may be discharged through a hole made by a fire. There is a risk of a fire in another battery module adjacent to the battery module or other structures due to the discharged spark. Especially, when a housing structure for accommodating the battery module is made of iron, high current may flow to another battery module through the housing structure, and thus, gas insulation breakdown (spark) occurs between components of another battery module such that a secondary fire or secondary explosion may occur.

DISCLOSURE

Technical Problem

The present disclosure is designed to solve the problems of the related art, and therefore the present disclosure is directed to providing a battery module capable of preventing a fire from increasing in size and preventing electrical short circuits due to dew condensation in case of a fire.

Other objects and advantages of the present disclosure may be understood from the following description and will become more fully apparent from embodiments of the present disclosure. Also, it will be easily understood that the objects and advantages of the present disclosure may be realized by the means shown in the appended claims and combinations thereof.

Technical Solution

A battery module according to the present disclosure for achieving the object includes:
  a cell assembly having a plurality of battery cells;
  a front cover including an upper wall, a lower wall, a left wall, and a right wall, which form an inner space; and
  a module case accommodating the cell assembly in the inner space, coupled to the front cover, and including a cover portion that has a portion protruding to face at least one of the upper wall, the lower wall, the left wall, and the right wall of the front cover.
  Also, the front cover may further include:
  an upper duct formed on an upper end of the front cover and configured to introduce outside air into the module case; and
  a lower duct formed on a lower end of the front cover and configured to introduce outside air into the module case, and
  wherein the module case may further include:
  an upper plate arranged above the cell assembly and including a first cover portion extending from an end portion of the upper plate to face an inner surface of the upper duct; and
  a lower plate arranged below the cell assembly, configured to be coupled to the upper plate, and including a second cover portion extending from an end portion to face an inner surface of the lower duct.
  Furthermore, the first cover portion may include a main body portion in contact with an upper surface, a lower surface of the upper duct, and a bent portion which is bent and extends from the main body portion, and
  the second cover portion may include a main body portion so as to be in contact with a lower surface of the lower duct, and a bent portion which is bent and extends from the main body portion.
  Also, the module case may further include:
  a first insulating plate having electrical insulation, arranged between the upper plate and the cell assembly, and extending to cover an upper surface of the cell assembly; and
  a second insulating plate having electrical insulation, arranged between the lower plate and the cell assembly, and extending to cover a lower surface of the cell assembly.

Furthermore, the first insulating plate may include a first protection portion extending from an end portion of the first insulating plate to face the inner surface of the upper duct, and the second insulating plate may include a second protection portion extending from an end portion of the second insulating plate to face the inner surface of the lower duct.

Also, each of the first protection portion and the second protection portion may further include a sealing member configured to expand in volume at a predetermined temperature or more to seal the duct.

Furthermore, each of the first insulating plate and the second insulating plate may include a partition wall portion that is bent from an outer peripheral end portion toward the cell assembly and extends along the outer peripheral end portion.

Also, the second insulating plate may have an at least partially inclined surface.

Furthermore, a discharge port configured to discharge a fluid flowing along the inclined surface to the outside may be further included.

Also, a battery rack according to the present disclosure for achieving the object as described above includes at least one battery module.

Also, a power storage device according to the present disclosure for achieving the object as described above includes at least one battery module.

Advantageous Effects

According to one aspect of the present disclosure, the present disclosure includes a cover portion in a module case, and thus, when a fire occurs inside the battery module, a double layer may be formed by the cover portion facing at least one of an upper wall, a lower wall, a left wall, and a right wall of a front cover, thereby preventing a hole from being made by the fire in at least one of the upper wall, the lower wall, the left wall, and the right wall of the front cover. Accordingly, the battery module of the present disclosure may significantly increase the safety against a fire.

Also, according to one aspect of an embodiment of the present disclosure, the present disclosure further includes a first insulating plate and a second insulating plate, and thus, in a case where dew condensation occurs due to a temperature difference between the inside and the outside of the module case during use of the module case, water formed by the dew condensation may be prevented from forming a current carrying path between an upper plate or a lower plate and a cell assembly. That is, even when water is accumulated in the module case, the water is accumulated in an inner surface of the first insulating plate or the second insulating plate, thereby preventing the water from being in contact with the upper plate and the lower plate. Accordingly, it is possible to effectively prevent the occurrence of an electric leakage, electric short circuit, or the like due to a dew condensation phenomenon of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
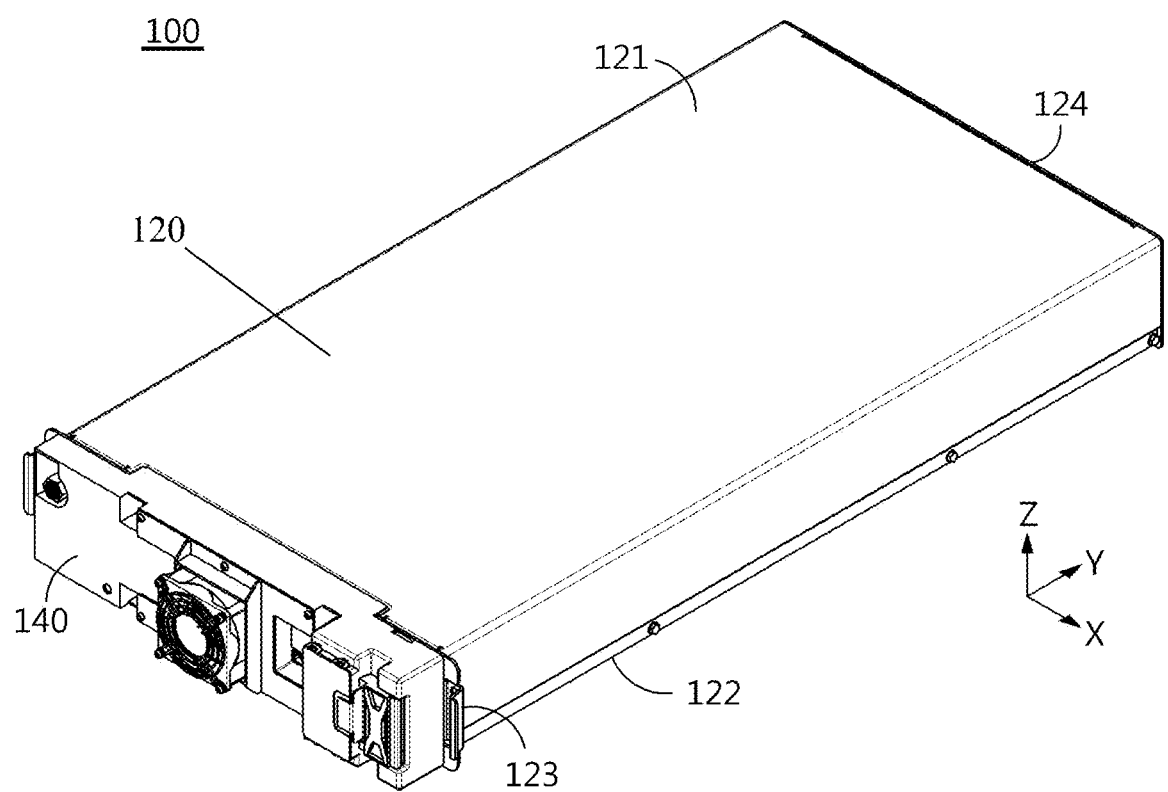
FIG. 1 is a schematic perspective view showing a battery module according to an embodiment of the present disclosure.
Figure 2:
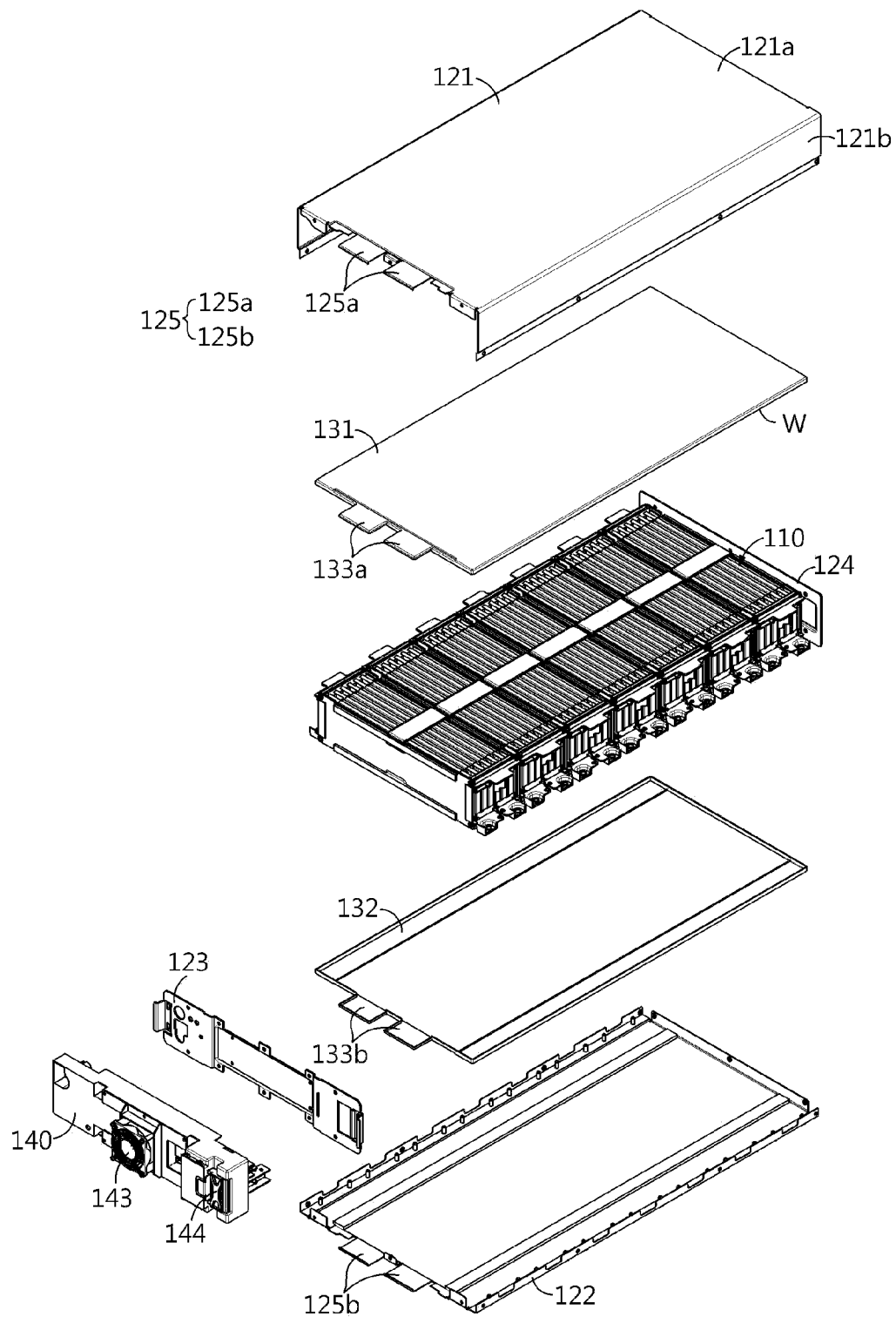
FIG. 2 is a schematic exploded perspective view showing a state in which components of a battery module are separated, according to an embodiment of the present disclosure.
Figure 3:
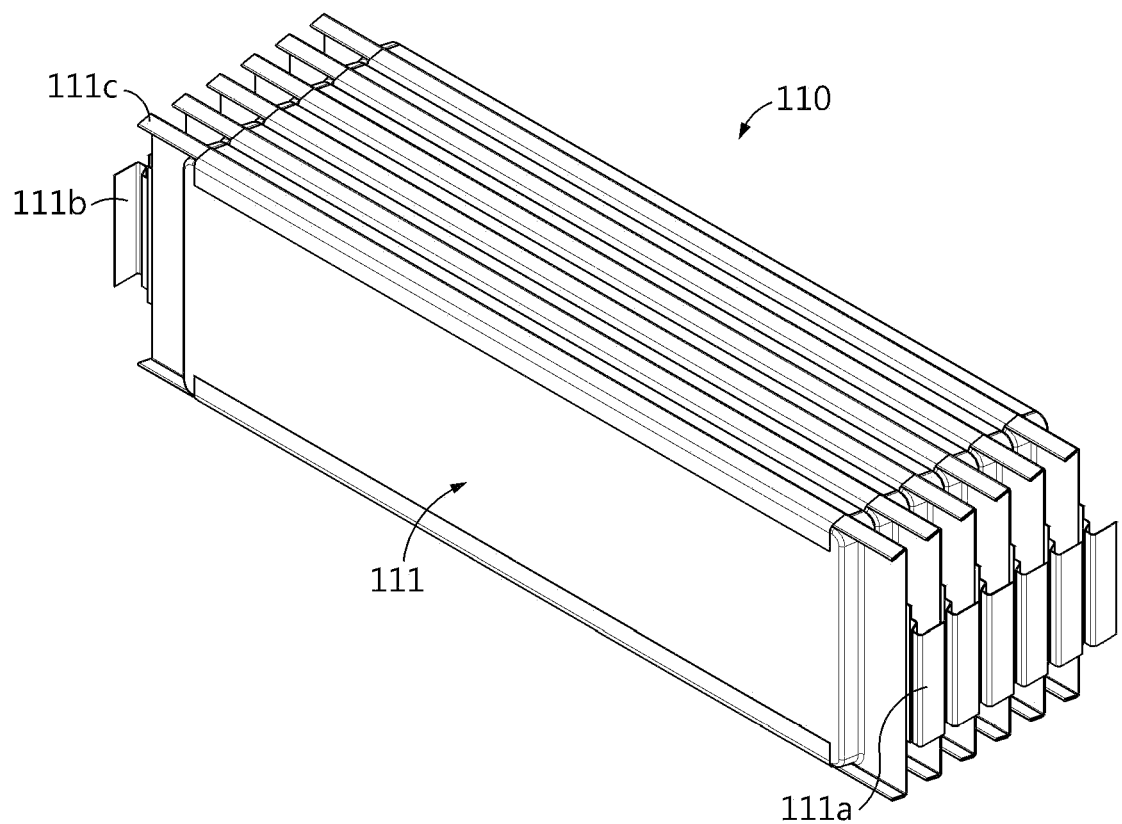
FIG. 3 is a schematic perspective view showing a state of a cell assembly of a battery module, according to an embodiment of the present disclosure.

FIG. 1 is a schematic perspective view showing a battery module according to an embodiment of the present disclosure. FIG. 2 is a schematic exploded perspective view showing a state in which components of a battery module are separated, according to an embodiment of the present disclosure. Also, FIG. 3 is a schematic perspective view showing a state of a cell assembly of a battery module, according to an embodiment of the present disclosure. For reference, a front-rear direction is represented as a Y direction, a left-right direction is represented as an X direction, and an up-down direction is represented as a Z direction.

Referring to FIGS. 1 to 3, a battery module 100 of the present disclosure includes a cell assembly 110 having a plurality of battery cells 111, a front cover 140, and a module case 120.

Here, the cell assembly 110 may include the plurality of battery cells 111 stacked on each other in the front-rear direction. As shown in FIG. 3, the cell assembly 110 may include six pouch battery cells 111. As shown in FIG. 2, the battery module 100 may include seven cell assemblies 110.

The battery cell 111 may be a pouch-type battery cell 111. For example, as shown in FIG. 3, the cell assembly 110 may be configured in a form in which a plurality of pouch-type battery cells 111 are stacked on each other side by side in the front-rear direction (Y direction). Especially, the pouch-type battery cell 111 may include an electrode assembly (not shown), an electrolyte (not shown), and a pouch 111c.

Furthermore, as shown in FIG. 3, a positive electrode lead 111a and a negative electrode lead 111b may be formed at opposite end portions of the battery cell 111 in the left-right direction (X direction) with respect to the center of the battery cell 111. That is, the positive electrode lead 111a may be provided at one end portion with respect to the center of the battery cell 111. Also, the negative electrode lead 111b may be provided at the other end portion with respect to the center of the battery cell 111.

However, the battery module 100 according to the present disclosure is not limited to the pouch-type battery cell 111 described above, and various battery cells 111 known at the time of filing of the present application may be employed.

In the battery module 100 according to the present disclosure, a bus bar (not shown) electrically connecting the plurality of battery cells 111 may be provided at each of left and right portions of the cell assembly 110. The bus bar may include a metal, for example, aluminum, copper, or nickel. The bus bar may be configured to contact the positive electrode lead 111a or the negative electrode lead 111b of each of the plurality of battery cells 111.

Meanwhile, the module case 120 may have an inner space to accommodate the cell assembly 110 therein. In detail, the module case 120 may include an upper plate 121, a lower plate 122, a front plate 123, and a rear plate 124. Each of the upper plate 121, the lower plate 122, the front plate 123, and the rear plate 124 may include steel, an aluminum alloy, or a stainless steel material.

In detail, the lower plate 122 may have an area greater than a size of a lower surface of at least one cell assembly 110 to mount the at least one cell assembly 110 thereon. The lower plate 122 may have a plate shape extending in a horizontal direction.

Also, the upper plate 121 may include a top portion 121a and a side portion 121b. The top portion 121a may have a plate shape extending in the horizontal direction to cover an upper portion of the cell assembly 110. The side portion 121b may have a plate shape extending downward from both end portions of the top portion 121a in the left-right direction to cover both side portions of the cell assembly 110 in the left-right direction.

Also, the side portion 121b may be coupled to a portion of the lower plate 122. For example, as shown in FIG. 2, the upper plate 121 may include the top portion 121a having a plate shape extending in the front-rear and left-right directions.

Furthermore, the upper plate 121 may include two side portions 121b extending downward from each of both side portions of the top portion 121a in the left-right direction. Furthermore, a lower end portion of each of the two side portions 121b may be configured to be coupled to both end portions of the lower plate 122 in the left-right direction. In this case, a coupling method may be a male-female coupling method or a welding coupling method.

Furthermore, the front plate 123 may be configured to cover the front of the cell assembly 110. For example, the front plate 123 may have a plate shape having a size greater than a size of a front surface of the battery cell 111. The plate shape may be erected in the up-down direction.

Furthermore, a portion of the outer peripheral portion of the front plate 123 may be coupled to the lower plate 122. For example, a lower portion of the outer peripheral portion of the front plate 123 may be coupled to a front end portion of the lower plate 122. Furthermore, an upper portion of the outer peripheral portion of the front plate 123 may be coupled to a front end portion of the upper plate 121. Here, bolt coupling may be employed as a coupling method.

Also, the rear plate 124 may be configured to cover the rear of the cell assembly 110. For example, the rear plate 124 may have a plate shape having a size greater than a size of a rear surface of the battery cell 111.

Also, a portion of the outer peripheral portion of the rear plate 124 may be coupled to the lower plate 122. For example, a lower portion of the outer peripheral portion of the rear plate 124 may be coupled to a rear end portion of the lower plate 122. Furthermore, an upper portion of the outer peripheral portion of the rear plate 124 may be coupled to a rear end portion of the upper plate 121. Here, bolt coupling may be employed as a coupling method. A discharge hole H formed to allow outside air to flow in or to discharge inside air to the outside may be formed in the rear plate 124.

Furthermore, the module case 120 may include steel having excellent mechanical rigidity or a stainless steel material.

Figure 4:
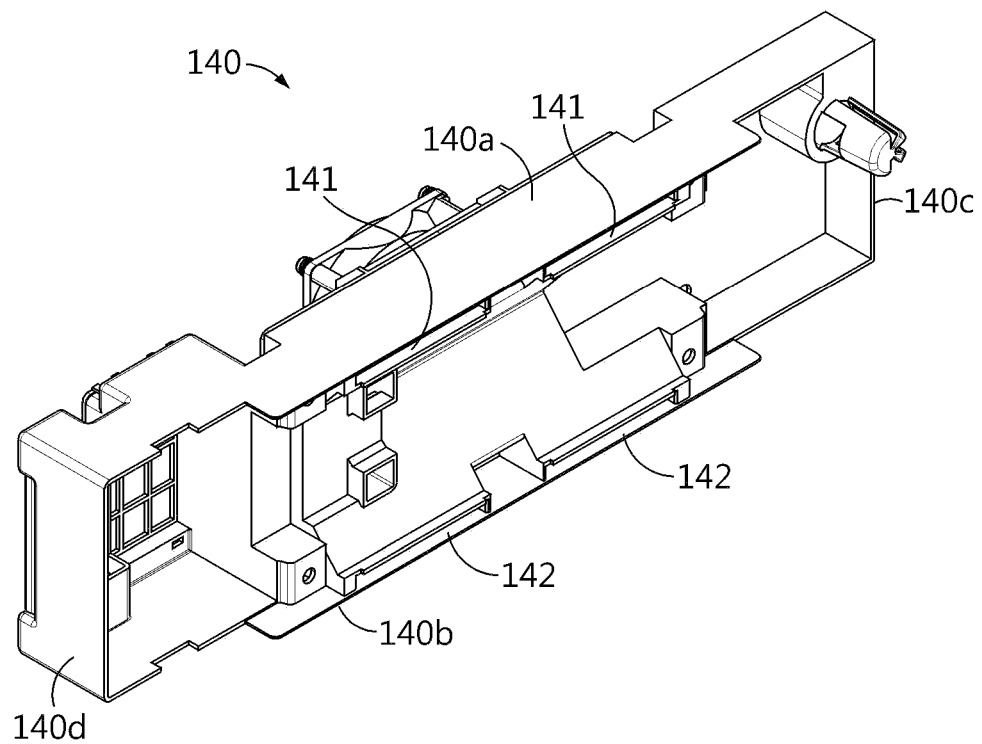
FIG. 4 is a schematic rear perspective view showing a state of a front cover of a battery module, according to an embodiment of the present disclosure.

FIG. 4 is a schematic rear perspective view showing a state of a front cover of a battery module, according to an embodiment of the present disclosure.

Referring back to FIGS. 1 and 2, the front cover 140 may include an upper wall 140a, a lower wall 140b, a left wall 140c, and a right wall 140d, which form an inner space. The front cover 140 may be coupled to a front end portion of the module case 120. For example, as shown in FIG. 1, the front cover 140 may be coupled to the front plate 123 of the module case 120.

Furthermore, the front cover 140 may include a material of electrical insulation. For example, the front cover 140 may include a polyvinyl chloride material.

Also, the module case 120 may include a cover portion 125 that has a portion protruding to face at least one of the upper wall 140a, the lower wall 140b, the left wall 140c, and the right wall 140d. For example, as shown in FIG. 2, when the Y direction is viewed as the front-rear direction, two cover portions 125a protruding toward the front cover 140 may be provided on a front end surface of the upper plate 121 of the module case 120. Two cover portions 125b protruding toward the front cover 140 may be provided on a front end surface of the lower plate 122.

Therefore, according to this configuration of the present disclosure, the present disclosure includes a cover portion 125, and thus, when a fire occurs in the battery module 100, a double layer may be formed by the cover portion 125 facing at least one of the upper wall 140a, the lower wall 140b, the left wall 140c, and the right wall 140d of the front cover 140, thereby preventing a hole from being made by the fire in at least one of the upper wall 140a, the lower wall 140b, the left wall 140c, and the right wall 140d of the front cover 140. Accordingly, the present disclosure may significantly increase the safety against a fire.

Figure 5:
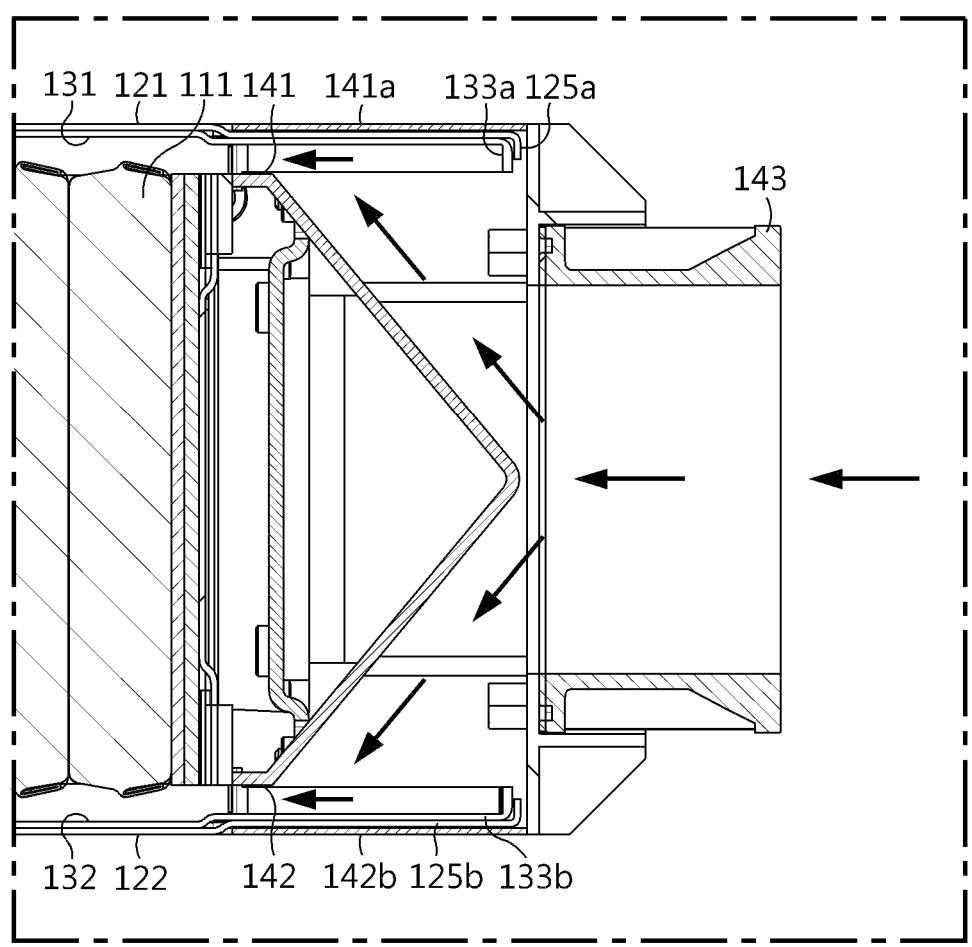
FIG. 5 is a schematic partial vertical cross-sectional view showing an internal state of the battery module of FIG. 1.

FIG. 5 is a schematic partial vertical cross-sectional view showing an internal state taken along line C-C' of the battery module of FIG. 1.

Referring to FIG. 5 together with FIGS. 2 and 4, the front cover 140 of the battery module 100 according to an embodiment of the present disclosure may include an upper duct 141 and a lower duct 142. The upper duct 141 may be formed on an upper end of the front cover 140, and may be configured in such a manner that outside air is introduced into the module case 120. Also, the upper duct 141 may have a rectangular tube shape in which a portion extends in the front-rear direction. A ceiling inside the upper duct 141 may be the upper wall 140a of the front cover 140.

Also, the lower duct 142 may be formed on a lower end of the front cover 140, and may be configured in such a manner that outside air is introduced into the module case 120. Also, the lower duct 142 may have a rectangular tube shape in which a portion extends in the front-rear direction. A bottom inside the lower duct 142 may be the lower wall 140b of the front cover 140.

Furthermore, the module case 120 may include the upper plate 121 located on the cell assembly 110, and the lower plate 122 located below the cell assembly 110. The upper plate 121 may include a first cover portion 125a. The first cover portion 125a may protrude and extend from an end portion to face an inner surface of the upper duct 141. For example, as shown in FIG. 5, the first cover portion 125a may be configured to face a ceiling (upper wall) 141a inside the upper duct 141.

Also, the lower plate 122 may include a second cover portion 125b. The second cover portion 125b may protrude and extend from an end portion to face an inner surface of the lower duct 142. For example, as shown in FIG. 5, the second cover portion 125b may be configured to face a bottom (lower wall) 142b inside the lower duct 142.

Furthermore, the upper duct 141 and the lower duct 142 may each be configured to communicate with a blowing fan 143. The blowing fan 143 may be configured to transmit outside air into the module case 120.

Also, the front cover may include an external terminal (not shown) for electrical connection between the battery module 100 and an external device, and a single cover 144 accommodating the external terminal.

Therefore, according to this configuration of the present disclosure, the present disclosure includes the first cover portion 125a and the second cover portion 125b respectively configured to face inner surfaces of the upper duct 141 and the lower duct 142 of the front cover 140, and thus, when a fire occurs in the battery module 100, a double layer may be formed by the first cover portion 125a or the second cover portion 125b, thereby preventing a hole from being made by the fire in the inner surfaces of the upper duct 141 and the lower duct 142 of the front cover 140. Accordingly, the present disclosure may significantly increase the safety against a fire.

Figure 6:
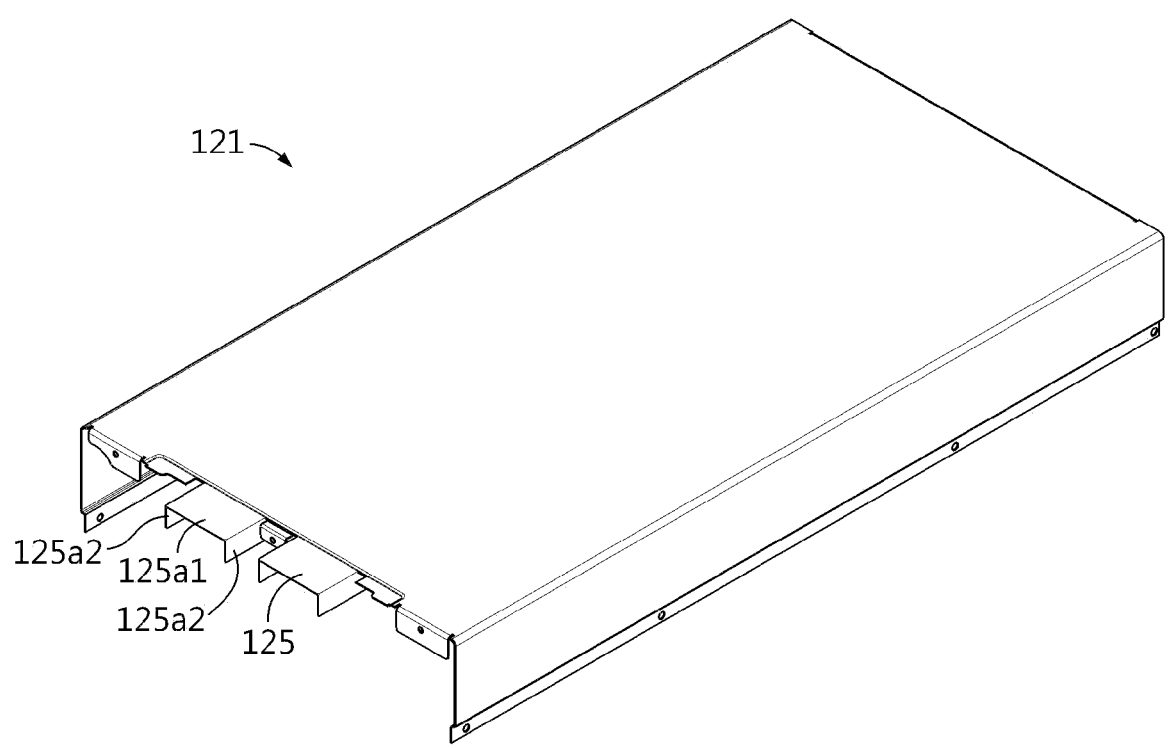
FIG. 6 is a schematic perspective view of an upper plate of a battery module, according to another embodiment of the present disclosure.

FIG. 6 is a schematic perspective view of an upper plate of a battery module, according to another embodiment of the present disclosure.

Referring to FIG. 6, the upper plate 121 of the battery module 100 according to another embodiment of the present disclosure may further include a bent portion 125a2 when compared with the upper plate 121 of FIG. 2. Other than that, remaining configurations may be the same.

In detail, the first cover portion 125a of the upper plate 121 may be configured to be in close contact with at least two of an upper surface, a lower surface, a left surface, and a right surface of the upper duct 141. For example, the first cover portion 125a may include a main body portion 125a1 and the bent portion 125a2. The main body portion 125a1 may be configured to be in close contact with the upper surface of the upper duct 141. The bent portion 125a2 may be configured to be in close contact with the left surface or the right surface of the upper duct 141. The main body portion 125a1 may have a plate shape protruding toward the upper duct 141. The bent portion 125a2 may be bent downward from a left end or a right end of the main body portion 125a1, and may have a shape extending downward.

Also, although not shown, the second cover portion 125b of the lower plate 122 may also include a main body portion and a bent portion, which face the inner surface of the lower duct 142, as the first cover portion 125a of the upper plate 121.

Therefore, according to this configuration of the present disclosure, the present disclosure includes the main body portion 125a1 and the bent portion 125a2 respectively in the first cover portion 125a and the second cover portion 125b, and thus, when a fire occurs in the battery module 100, due to the first cover portion 125a or the second cover portion 125b, a hole may be prevented from being made by the fire in at least two of upper surfaces, lower surfaces, left surfaces, and right surfaces of the upper duct 141 and the lower duct 142. Accordingly, the present disclosure may significantly increase the safety against a fire.

Meanwhile, referring back to FIG. 2, the module case 120 may further include a first insulating plate 131 and a second insulating plate 132. The first insulating plate 131 and the second insulating plate 132 may have electrical insulation. For example, the first insulating plate 131 may include polyethylene terephthalate, polyvinyl chloride, or silicon material.

Also, the first insulating plate 131 may be interposed between the upper plate 121 and the cell assembly 110. The first insulating plate 131 may have a shape extending in a horizontal direction to cover an upper surface of the cell assembly 110. The first insulating plate 131 may have a size corresponding to the upper surface of the cell assembly 110.

Furthermore, the second insulating plate 132 may be interposed between the lower plate 122 and the cell assembly 110. The second insulating plate 132 may have a shape extending in a horizontal direction to cover a lower surface of the cell assembly 110. The second insulating plate 132 may have a size corresponding to the lower surface of the cell assembly 110.

Therefore, according to this configuration of the present disclosure, the present disclosure further includes the first insulating plate 131 and the second insulating plate 132, and thus, in a case where dew condensation occurs due to a temperature difference between the inside and the outside of the module case 120 during use of the module case 120, water formed by the dew condensation may prevent formation of a current carrying path between the upper plate 121 or the lower plate 122 and the cell assembly 110. That is, even when water accumulates inside the module case 120, the water is accommodated in an inner surface of the first insulating plate 131 or the second insulating plate 132, thereby preventing the water from being in contact with the upper plate 121 or the lower plate 122. Accordingly, it is possible to effectively prevent the occurrence of an electric leakage, electric short circuit, or the like due to a dew condensation phenomenon of the battery module 100.

Meanwhile, referring back to FIGS. 2 and 5, the first insulating plate 131 of the present disclosure may include a first protection portion 133a. The first protection portion 133a may have a shape protruding and extending from an end portion to face the inner surface of the upper duct 141. The first protection portion 133a may be configured to face an inner ceiling surface of the upper duct 141. The first protection portion 133a may be located below the first cover portion 125a as shown in FIG. 5. That is, the first protection portion 133a may form a three-layer structure together with the upper wall 140a of the front cover 140 and the first cover portion 125a.

Also, the second insulating plate 132 of the present disclosure may include a second protection portion 133b. The second protection portion 133b may have a shape protruding and extending from an end portion to face the inner surface of the lower duct 142. The second protection portion 133b may be configured to face an inner bottom surface of the lower duct 142. The second protection portion 133b may be located on the second cover portion 125b as shown in FIG. 5. That is, the second protection portion 133b may form a three-layer structure together with the lower wall 140b of the front cover 140 and the second cover portion 125b.

Therefore, according to this configuration of the present disclosure, the present disclosure includes the first protection portion 133a and the second protection portion 133b respectively in the first insulating plate 131 and the second insulating plate 132, thereby forming a wall of a three-layer structure, and when a fire occur in the battery module 100, due to the three-layer structure, a hole may be prevented from being made by the fire in the inner surfaces of the upper duct 141 and the lower duct 142. Accordingly, the present disclosure may significantly increase the safety against a fire.

Figure 7:
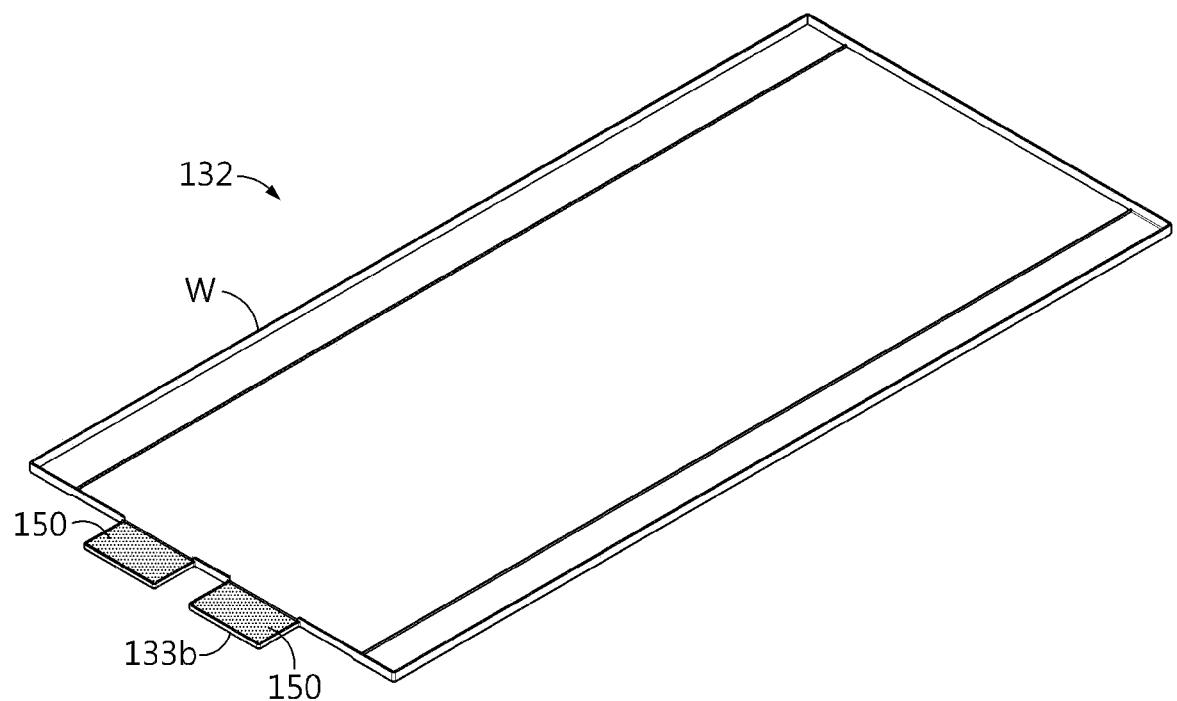
FIG. 7 is a schematic perspective view of a second insulating plate of a battery module, according to another embodiment of the present disclosure.

FIG. 7 is a schematic perspective view of a second insulating plate of a battery module, according to another embodiment of the present disclosure.

Referring to FIG. 7, the first insulating plate 131 and the second insulating plate 132 of the battery module 100 according to another embodiment of the present disclosure may each further include a sealing member 150 when compared with the battery module 100 of FIG. 2.

In detail, the sealing member 150 may be configured to expand in volume at a predetermined temperature or more to seal the upper duct 141 or the lower duct 142. For example, the predetermined temperature may be 200 degrees Celsius or more. Also, the sealing member 150 may prevent a flame, smoke, and high-temperature gas from leaking out through the upper duct 141 or the lower duct 142. Furthermore, the sealing member 150 may have heat insulating properties.

At least a portion of the sealing member 150 may be, for example, a material of the FS1000 available from Saint-Gobain. Alternatively, the sealing member 150 may include graphite flakes that expand in volume at a predetermined temperature. Also, when a central portion of the sealing member 150 is heated to 200 degrees Celsius or more, the central portion is carbonized to generate a carbonized layer in which volume expansion occurs.

Also, as shown in FIG. 7, the sealing member 150 may be arranged on the second protection portion 133b of the second insulating plate 132. Although not shown, the sealing member 150 may be arranged on the first protection portion 133a of the first insulating plate 131.

Therefore, according to this configuration of the present disclosure, the present disclosure includes the sealing member 150 configured to expand in volume at a predetermined temperature or more for sealing, and thus, when a fire or thermal runaway occurs in the cell assembly 110, the volume of the sealing member 150 expands due to high-temperature gas or air, and the volume-expanded sealing member 150 may seal the upper duct 141 or the lower duct 142 such that outside air may no longer be introduced into the module case 120. Accordingly, the module case 120 sealed from the outside may prevent a fire of the cell assembly 110 from further spreading, and ultimately induce natural fire extinguishing.

Meanwhile, referring back to FIG. 7, the first insulating plate 131 or the second insulating plate 132 of the present disclosure may each include a partition wall portion W. The partition wall portion W may have a shape bent toward the cell assembly 110 from an outer peripheral end portion. The partition wall portion W may have a shape extending along an outer peripheral portion of the first insulating plate 131 or the second insulating plate 132. For example, as shown in FIG. 7, the second insulating plate 132 may include the partition wall portion W extending along the outer periphery and protruding upward to a predetermined height.

Therefore, according to this configuration of the present disclosure, the first insulating plate 131 and the second insulating plate 132 of the present disclosure each includes the partition wall portion W, and thus, when dew condensation occurs inside the module case 120 due to a temperature difference between the outside and the inside of the module case 120 by the partition wall portion W, generated water may be accommodated in the first insulating plate 131 or the second insulating plate 132. That is, the water accommodated in the inner surface of the first insulating plate 131 or the second insulating plate 132 may move to the outer periphery, and thus may be prevented from flowing into the upper plate 121 or the lower plate 122. Accordingly, it is possible to effectively prevent the occurrence of an electric leakage, electric short circuit, or the like due to a dew condensation phenomenon of the battery module 100.

Figure 8:
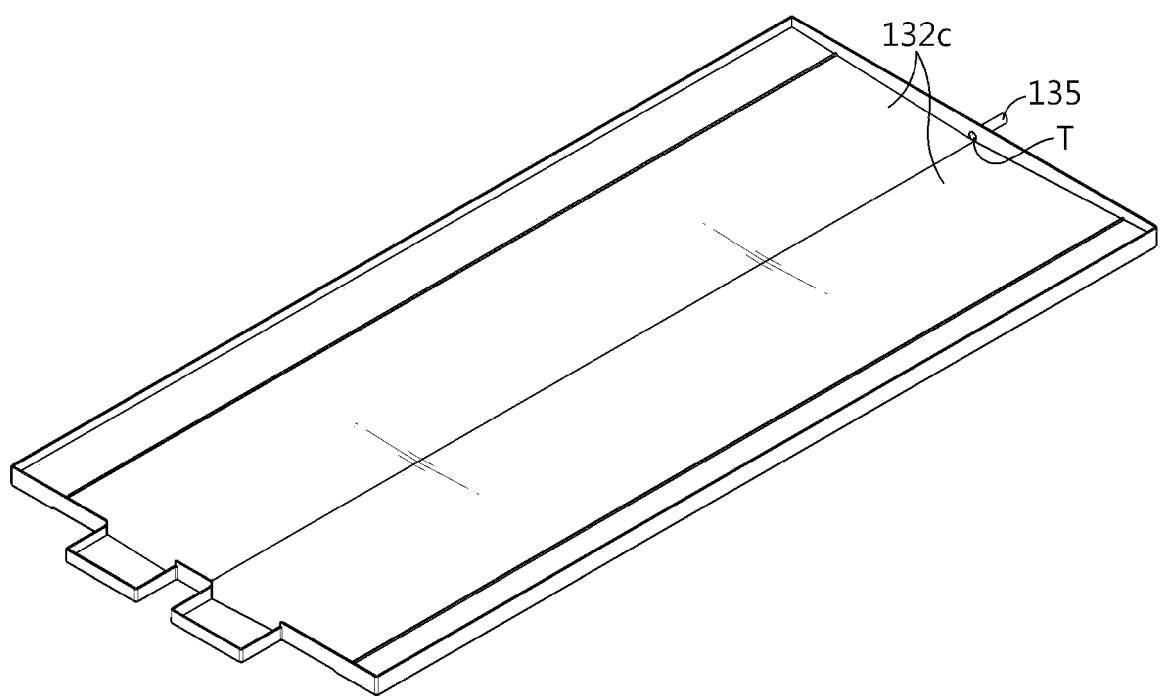
FIG. 8 is a schematic perspective view showing a second insulating plate of a battery module, according to another embodiment of the present disclosure.

FIG. 8 is a schematic perspective view showing a second insulating plate of a battery module, according to another embodiment of the present disclosure.

Referring to FIG. 8, the second insulating plate 132 of the battery module 100 according to another embodiment of the present disclosure may further have an at least partially inclined surface 132c when compared with the second insulating plate 132 of FIG. 2. For example, as shown in FIG. 8, the second insulating plate 132 may have an inclined surface having a low center in the left-right direction and a gradually increasing height toward a left end portion and a right end portion. For example, the inclined surface may have an angle of 1 to 5 degrees with respect to the ground.

Therefore, according to this configuration of the present disclosure, the second insulating plate 132 of the present disclosure has the at least partially inclined surface 132c, and thus, when dew condensation occurs inside the module case 120 due to a temperature difference between the outside and the inside of the module case 120, generated water may be accumulated in the center of the second insulating plate 132. That is, the second insulating plate 132 may prevent the water accumulated in the inner surface from moving to the outer periphery and flowing into the upper plate 121 or the lower plate 122. Accordingly, it is possible to effectively prevent the occurrence of an electric leakage, electric short circuit, or the like due to a dew condensation phenomenon of the battery module 100.

Meanwhile, referring back to FIG. 8, the second insulating plate 132 of the battery module 100 according to another embodiment of the present disclosure may further include a discharge port 135 when compared with the second insulating plate 132 of FIG. 2. The discharge port 135 may be configured to discharge a fluid to the outside. For example, the second insulating plate 132 shown in FIG. 8 may be configured in such a manner that water flowing along the inclined surface 132c is discharged to the outside by the discharge port 135. In this case, an opening T may be formed in a portion of a partition wall of the second insulating plate 132 to communicate with the discharge port 135.

Therefore, according to this configuration of the present disclosure, the present disclosure includes the discharge port 135 in the second insulating plate 132, and thus, when dew condensation occurs in the module case 120 due to a temperature difference between the outside and the inside of the module case 120, generated water may be accumulated in the center of the second insulating plate 132 along the inclined surface 132c, and the water accumulated in the center thereof may be discharged to the outside through the discharge port 135 again. Accordingly, it is possible to effectively prevent the occurrence of an electric leakage, electric short circuit, or the like due to a dew condensation phenomenon of the battery module 100.

Meanwhile, a battery rack (not shown) according to the present disclosure may include at least one battery module 100. The battery rack may include a rack case for accommodating the battery module 100. The battery rack may further include a battery management system (BMS) for performing charge and discharge control of a plurality of battery modules 100.

A power storage device (not shown) according to the present disclosure may include at least one battery modules 100 according to the present disclosure. Especially, the power storage device may include a plurality of battery modules 100 according to the present disclosure. Also, the plurality of battery modules 100 may be electrically connected to each other. The power storage device according to the present disclosure may be implemented in various forms, such as a smart grid system or an electric charging station.

Meanwhile, although the terms indicating directions such as up, down, left, right, before, and after described in the present specification are used, it would be obvious to a person skilled in the art that the terms are only for convenience of description and may vary depending on the position of an object or the position of an observer.

As described above, although the present disclosure has been described according to limited embodiments and drawings, the present disclosure is not limited thereto, and various modifications and variations are possible within the scope of the technical idea of the present disclosure and claims to be described below by those of ordinary skill in the art to which the present disclosure pertains.

| [Explanation of numeral references] | |
|---|---|
| 100: Battery module | 110: Cell assembly |
| 111: Battery cell | 120: Module case |
| 121, 122, 123, 124: Upper plate, Lower plate, Front plate, Rear plate | |
| 131, 132: First insulating plate, Second insulating plate | |
| 140: Front cover | |
| 140a, 140b, 140c, 140d: Upper wall, Lower wall, Left wall, Right wall | |
| 141, 142: Upper duct, Lower duct | |
| 125, 125a, 125b: Cover portion, First cover portion, Second cover portion | |
| 133a, 133b: First protection portion, Second protection portion | |
| 143: Blowing fan | |
| 150: Sealing member | W: Partition wall portion |
| 125a1, 125a2: Main body portion, Bent portion | |
| 132c: Inclined surface | 135: Discharge port |

What is claimed is:

1. A battery module comprising:
    a cell assembly having a plurality of battery cells;
    a front cover comprising an upper wall, a lower wall, a left wall, and a right wall, which form an inner space; and
    a module case accommodating the cell assembly within an inner space of the module case, coupled to the front cover, and comprising a cover portion that has a portion protruding to face at least one of the upper wall, the lower wall, the left wall, and the right wall of the front cover,
    wherein the front cover further comprises:
    an upper duct formed on an upper end of the front cover and configured to introduce outside air into the module case; and
    a lower duct formed on a lower end of the front cover and configured to introduce outside air into the module case, and
    wherein the module case further comprises:
    an upper plate arranged above the cell assembly and comprising a first cover portion extending from an end portion of the upper plate to face an inner surface of the upper duct; and
    a lower plate arranged below the cell assembly, configured to be coupled to the upper plate, and comprising a second cover portion extending from an end portion of the lower plate to face an inner surface of the lower duct.

2. The battery module of claim 1, wherein the first cover portion comprises a main body portion in contact with an upper surface of the upper duct, and a bent portion which is bent and extends from the main body portion, and
    wherein the second cover portion comprises a main body portion so as to be in contact with a lower surface of the lower duct, and a bent portion which is bent and extends from the main body portion.

3. The battery module of claim 1, further comprising:
    a first insulating plate having electrical insulation, arranged between the upper plate and the cell assembly, and extending to cover an upper surface of the cell assembly; and
    a second insulating plate having electrical insulation, arranged between the lower plate and the cell assembly, and extending to cover a lower surface of the cell assembly.

4. The battery module of claim 3, wherein the first insulating plate comprises a first protection portion extending from an end portion of the first insulating plate to face the inner surface of the upper duct, and
    wherein the second insulating plate comprises a second protection portion extending from an end portion of the second insulating plate to face the inner surface of the lower duct.

5. The battery module of claim 4, wherein each of the first protection portion and the second protection portion comprises a sealing member configured to expand in volume at a predetermined temperature or more to seal the duct.

6. The battery module of claim 3, wherein each of the first insulating plate and the second insulating plate comprises a partition wall portion that is bent from an outer peripheral end portion toward the cell assembly and extends along the outer peripheral end portion.

7. The battery module of claim 3, wherein the second insulating plate has an at least partially inclined surface.

8. The battery module of claim 7, further comprising a discharge port configured to discharge a fluid flowing along the inclined surface to outside.

9. A battery rack comprising at least one battery module according to claim 1.

10. A power storage device comprising at least one battery module according to claim 1.

* * * * *